(12) United States Patent
White et al.

(10) Patent No.: US 12,421,109 B2
(45) Date of Patent: Sep. 23, 2025

(54) PROCESS AND APPARATUS FOR CRACKING AMMONIA

(71) Applicant: Air Products and Chemicals, Inc., Allentown, PA (US)

(72) Inventors: Vincent White, Surrey (GB); Andrew Shaw, Sunbury on Thames (GB); Simon Craig Saloway, Surrey (GB)

(73) Assignee: Air Products and Chemicals, Inc., Allentown, PA (US)

( * ) Notice: Subject to any disclaimer, the term of this patent is extended or adjusted under 35 U.S.C. 154(b) by 509 days.

(21) Appl. No.: 17/990,817

(22) Filed: Nov. 21, 2022

(65) Prior Publication Data

US 2024/0166503 A1 May 23, 2024

(51) Int. Cl.
*C01B 3/00* (2006.01)
*B01J 8/00* (2006.01)
(Continued)

(52) U.S. Cl.
CPC ............ *C01B 3/047* (2013.01); *B01J 8/0005* (2013.01); *B01J 8/0457* (2013.01); *B01J 8/062* (2013.01); *C01B 3/508* (2013.01); *B01J 2208/00176* (2013.01); *B01J 2208/00194* (2013.01); *B01J 2208/00274* (2013.01); *B01J 2208/00283* (2013.01); *B01J 2208/025* (2013.01); *B01J 2208/065* (2013.01);
(Continued)

(58) Field of Classification Search
CPC ....... C01B 3/047; C01B 3/508; B01B 8/0005; B01J 8/0457; B01J 8/062
USPC .................................................... 423/685.2
See application file for complete search history.

(56) References Cited

U.S. PATENT DOCUMENTS 11,084,012 B2  8/2021  Jiang et al.
11,287,089 B1  3/2022  Cohen et al.
(Continued)

FOREIGN PATENT DOCUMENTS

CN   111957270 A   11/2020
CN   112050202 A1  12/2020
(Continued)

OTHER PUBLICATIONS

Lamb, Krystina, et al; Ammonia decomposition kinetics over LiOH-promoted, a-Al2O3-supported Ru catalyst, International Journal of Hydrogen Energy; 44, Dec. 17, 2018 3726-3736.
(Continued)

*Primary Examiner* — James E McDonough
(74) *Attorney, Agent, or Firm* — Matthew R. Weaver (57) ABSTRACT

The invention concerns a process and apparatus for cracking ammonia in which heated ammonia gas at super-atmospheric pressure is partially cracked in at least two adiabatic reactors in series with interstage heating in which the feed temperature to a first reactor is higher than the feed temperature to a further reactor to produce a partially cracked ammonia gas which is then fed to catalyst-containing reactor tubes in a furnace to produce a cracked gas comprising hydrogen gas, nitrogen gas and residual ammonia gas. The use of the adiabatic reactors enables more efficient heat integration within the process and the higher temperature in the first reactor enables the use of a nickel-based catalyst in that reactor as an alternative solution to the potential problem of the presence of oil in the ammonia.

25 Claims, 1 Drawing Sheet

(51) Int. Cl.
  *B01J 8/04* (2006.01)
  *B01J 8/06* (2006.01)
  *C01B 3/04* (2006.01)
  *C01B 3/50* (2006.01)

(52) U.S. Cl.
  CPC ............. *C01B 2203/0277* (2013.01); *C01B 2203/043* (2013.01); *C01B 2203/0827* (2013.01); *C01B 2203/0866* (2013.01); *C01B 2203/0883* (2013.01); *C01B 2203/1058* (2013.01); *C01B 2203/1064* (2013.01); *C01B 2203/1205* (2013.01); *C01B 2203/1258* (2013.01); *C01B 2203/1294* (2013.01); *C01B 2203/142* (2013.01); *C01B 2203/1614* (2013.01); *C01B 2203/1628* (2013.01)

(56) References Cited

U.S. PATENT DOCUMENTS

| | | |
|---|---|---|
| 2015/0217278 A1 | 8/2015 | Hosono et al. |
| 2017/0203963 A1 | 7/2017 | Ravikumar et al. |
| 2017/0320729 A1 | 11/2017 | Saloway |
| 2020/0398240 A1* | 12/2020 | Jiang .................. B01J 23/755 |
| 2021/0001311 A1 | 1/2021 | Wu et al. |
| 2022/0189560 A1 | 6/2022 | Zhang et al. |

FOREIGN PATENT DOCUMENTS

| | | |
|---|---|---|
| EP | 3241805 A1 | 11/2017 |
| GB | 977830 A1 | 12/1964 |
| GB | 1142941 | 2/1969 |
| GB | 1353751 | 5/1974 |
| JP | 5330802 A2 | 12/1993 |
| KR | 20220398240 A | 6/2022 |
| WO | 2021257944 A1 | 12/2021 |
| WO | 2022189560 A | 9/2022 |
| WO | 2022189560 A1 | 9/2022 |

OTHER PUBLICATIONS

Boisen, Astrid et al; Why the optimal ammonia synthesis catalyst is not the optimal ammonia decomposition catalyst, Journal of Catalysis 230 Dec. 10, 2004, 309-312.

Ganley, J.C. et al; "A priori catalytic activity correlations: the difficult case of hydrogen production from ammonia"; Catalysis Letters vol. 96, Nos. 3-4, Jul. 2004.

* cited by examiner

PROCESS AND APPARATUS FOR CRACKING AMMONIA

TECHNICAL FIELD OF THE INVENTION

The present invention is in the technical field of cracking ammonia to produce hydrogen gas and preferred embodiments relate specifically to a process and apparatus for the production of hydrogen gas from liquid ammonia.

BACKGROUND OF THE INVENTION

Global interest in renewable energy and using this renewable energy to generate "green" hydrogen has driven the interest in converting the "green" hydrogen to "green" ammonia, as ammonia is simpler to transport over distance of hundreds or thousands of miles. Particularly, shipping liquid hydrogen is not commercially possible currently but shipping ammonia, which is in a liquid state, is currently practiced.

For use in a commercial fuel cell, the ammonia must be converted back to hydrogen according to the reaction.

This is an endothermic process, i.e., a process that requires heat, and hence higher temperatures will favor production of the products. The standard heat of reaction (per mole of ammonia) at 1 bar and 0° C. is 45.47 kJ/mol. The endothermic nature of the process dictates the need for a furnace.

The process is known as cracking (or sometimes "dissociation") and is usually performed over a catalyst. The gas produced (or "cracked gas") is a mixture of hydrogen ($H_2$) and nitrogen ($N_2$) gases although, since the cracking reaction is an equilibrium reaction, there is also some residual ammonia. The amount of ammonia in the cracked gas, generally referred to as "ammonia slip", may be varied by changing the temperature and pressure at which the ammonia is heated with higher temperatures and pressures favoring conversion thereby reducing the ammonia slip.

In most applications of crackers currently, the hydrogen and nitrogen mixture is utilised as is. However, as ammonia can be a poison to fuel cells, this stream, with ammonia suitably removed such as by scrubbing with water, can be used directly in a fuel cell. However, if the hydrogen is to be used in vehicle fueling, the nitrogen present provides a penalty to the process. The fuel to a vehicle fueling system is compressed to significant pressure—up to 900 bar. This means that the nitrogen, which is merely a diluent in the process, is also compressed, taking power, and taking storage volume and increasing anode gas purge requirement, decreasing efficiency. It is therefore beneficial where hydrogen is to be used in vehicle fueling, for the hydrogen and nitrogen to be separated.

There are many examples of ammonia cracking processes in the art, for example GB977830A, JP5330802A, CN111957270A, US2020/0398240A and KR2022/0085469A.

In addition, GB1142941A discloses a process for producing a fuel gas that is interchangeable with town gas. Ammonia is cracked to form a mixture of hydrogen and nitrogen and the mixture is then enriched by the addition of a gas having a calorific value higher than that of the mixture such as methane, propane or butane or mixtures thereof. Liquid ammonia is pumped as a cold liquid and vaporised by a closed hot water circuit. The ammonia vapor is cracked over a suitable catalyst in the tubes of a direct fired tube furnace after having been superheated by heat exchange with the flue gas from the furnace. The cracked gas is scrubbed with water to recover residual ammonia which is eventually recycled to the ammonia feed to the catalyst-filled tubes of the furnace. The purified cracked gas is enriched with propane and/or butane to produce the town gas product.

GB1142941A discloses that the cracking of the ammonia in a direct fired tube furnace in the presence of a suitable catalyst is preferred. However, the reference also discloses that other cracking processes could alternatively be used instead. In this context, GB1142941 mentions heating the ammonia to a suitable temperature and then passing the ammonia through an unheated bed of ammonia cracking catalyst to crack a proportion of the ammonia into hydrogen and nitrogen, cooling the gas in the process. The unconverted ammonia could be recovered as described above. Alternatively, the gas mixture could be reheated and passed through a second bed of catalyst to reduce further the ammonia content and that this could be repeated as many times as considered desirable.

GB1353751A discloses a process in which ammonia at a pressure in a range from 20 atm to 300 atm is cracked in two stages within heated reactor tubes. In the first stage, the gas at a temperature in a range from 450 to 800° C. is passed through a layer of nickel-, iron- or cobalt-containing catalyst produced by co-precipitating with a carrier of aluminum oxide and magnesium oxide or magnesium-aluminum spinel. The catalyst of the first stage may alternatively consist of either a ceramic material impregnated with iron or iron impregnated on a pre-formed carrier consisting of magnesium oxide and aluminum oxide and promoted with potassium oxide. After the first stage, the gas then passes at a temperature in a range from 450 to 600° C. through a layer of a doubly or triply promoted iron catalyst which forms the second stage.

WO2022/189560A discloses an ammonia cracking process involving a fired reactor having tubes filled with iron catalyst. Liquid ammonia is taken from storage, pumped and then pre-heated and evaporated to form ammonia gas which is heated by heat exchange with cracked gas. The heated ammonia gas is further heated by heat exchange against flue gas in the convection section of the fired reactor and is then fed to two adiabatic reactors in series (with interstage heating against flue gas) where it is partially cracked. The partially cracked gas is then heated by heat exchange with the flue gas in the convection section before being fed to the catalyst-filled tubes of the fired reactor to crack the remaining ammonia.

U.S. Pat. No. 11,287,089A discloses a hydrogen fueling system in which ammonia is cracked onsite into hydrogen and nitrogen in an ammonia cracker operating at a pressure in the range from 5 bar to 40 bar, and in which the hydrogen is compressed to a pressure of at least 30 MPa (300 bar) and stored ready for dispensing to vehicles. When being dispensed, the compressed gas from storage is cooled to a temperature in a range from −40° C. to 5° C., by heat exchange with a heat exchange fluid, such as D-limonene, FP40 or a water/glycol mixture, circulating around a closed loop. The heat exchange fluid is cooled by heat exchange with the ammonia feed to the cracker and may be further cooled in a conventional refrigeration system. Where the ammonia feed is liquid, at least part of the duty required to vaporize the liquid ammonia is provided by the heat exchange fluid. The vaporization of liquid ammonia is usually effected at normal or sub-atmospheric pressure. U.S. Pat. No. 11,287,089A exemplifies a system producing 7.5 tons/day hydrogen gas.

There is, however, still a need generally for improved processes for the production of hydrogen from ammonia and specifically for processes that are more efficient in terms of energy consumption and/or that have higher levels of hydrogen recovery and/or that reduce or eliminate the need to combust fossil fuels.

BRIEF SUMMARY OF THE INVENTION

According to a first aspect of the present invention, there is provided a process for cracking ammonia comprising providing a heated ammonia gas at super-atmospheric pressure; feeding the heated ammonia gas at a first temperature (T1) to a first adiabatic reactor comprising a catalyst bed to crack a portion of the ammonia and produce an intermediate partially cracked ammonia gas; heating the intermediate partially cracked ammonia gas to produce a heated intermediate partially cracked ammonia gas; feeding the heated intermediate partially cracked ammonia gas, or a heated intermediate partially cracked ammonia gas derived therefrom, at a second temperature (T2) which is lower than the first temperature (T1) to a further adiabatic reactor comprising a catalyst bed to crack a further portion of the ammonia and produce a partially cracked ammonia gas; combusting fuel with an oxidant gas in a furnace to heat catalyst-containing reactor tubes and form a flue gas; and feeding the partially cracked ammonia gas to the catalyst-containing reactor tubes to cause cracking of further ammonia to produce a cracked gas comprising hydrogen gas, nitrogen gas and residual ammonia.

Partially cracking ammonia in adiabatic reactors comprising ammonia cracking catalyst(s) prior to completing the cracking process in catalyst-filled tubes of a fired furnace provides opportunities to optimize the cracking process by fully utilizing the heat energy in the cracked gas and flue gas resulting in a reduction in energy consumption, an increase in hydrogen production and/or reduced reliance on hydrocarbon fuels such as natural gas.

In addition, the higher feed temperature to the first adiabatic reactor enables the use of catalysts containing a less catalytically active metal, e.g., a nickel-based catalyst, in place of catalysts containing a more catalytically active metal, e.g., a ruthenium-based catalyst. Therefore, in preferred embodiments, the catalyst bed of the first adiabatic reactor comprises, e.g., contains or consists of, a nickel-based catalyst. Catalysts containing a less catalytically active metal, e.g., nickel, tend to be less expensive than catalysts containing a more catalytically active metal, e.g., ruthenium. Thus, these embodiments are likely to be significantly less expensive than embodiments in which the bed of the first adiabatic reactor comprising a ruthenium-based catalyst, particularly if the catalyst bed needs to be replaced regularly due to degradation and/or contamination by oil present in the ammonia.

The catalyst bed of the second adiabatic reactor may comprise, e.g., contain or consist of, an upstream layer of a less active catalyst, e.g., a nickel-based catalyst, and a downstream layer of a more active catalyst, e.g., a ruthenium-based catalyst. Again, due to the difference in cost of the catalytically active metals, these embodiments are likely to be significantly less expensive than other arrangements involving the use of more of the more active catalysts.

In some embodiments, it may even be possible to eliminate completely the use of a more active catalyst, e.g., a ruthenium-based catalyst. In these embodiments, the bed of the second adiabatic reactor may contain a less active catalyst, e.g., a nickel-based catalyst, as the sole catalyst, resulting in further reductions in cost.

According to a second aspect of the present invention, there is provided an apparatus for cracking ammonia comprising a first adiabatic reactor for partially cracking heated ammonia gas at super-atmospheric pressure, the reactor comprising an inlet for heated ammonia gas, a catalyst bed having an upstream end in fluid flow communication with the inlet and a downstream end in fluid flow communication with an outlet for intermediate partially cracked ammonia gas; a further adiabatic reactor for cracking heated intermediate partially cracked ammonia gas, or heated intermediate partially cracked ammonia gas derived therefrom, the reactor comprising an inlet in fluid flow communication with the outlet of the first adiabatic reactor, a catalyst bed having an upstream end in fluid flow communication with the inlet and a downstream end in fluid flow communication with an outlet for partially cracked ammonia gas; a furnace comprising a radiant section comprising at least one inlet for fuel and oxidant gas in fluid flow communication with at least one burner, catalyst-containing reactor tubes having upstream ends in fluid flow communication with the outlet of the further adiabatic reactor and downstream ends in fluid flow communication with an outlet for cracked gas; and a convection section in fluid flow communication with the radiant section comprising an outlet for flue gas; a first heat exchanger for heating ammonia gas by heat exchange with flue gas in the convection section of the furnace, the first heat exchanger comprising an inlet for ammonia gas and an outlet in direct fluid flow communication with the inlet of the first adiabatic reactor, and a second heat exchanger for heating intermediate partially cracked ammonia gas by heat exchange with flue gas in the convection section of the furnace, the second heat exchanger having an inlet in direct fluid flow communication with the outlet of the first adiabatic reactor and an outlet in fluid flow communication with the inlet of the further adiabatic reactor, wherein the first heat exchanger is located upstream of the second heat exchanger within the convection section of the furnace relative to the flow of flue gas.

The apparatus of the second aspect of the invention is particularly suitable to carry out the process of the first aspect of the invention.

DESCRIPTION OF THE INVENTION

Amounts of components given in parts per million (or ppm) are calculated by weight unless otherwise stated. In addition, all percentages are calculated by mole unless otherwise stated. Moreover, any references to pressure are references to absolute pressure unless otherwise stated.

In the context of the present invention, the activity of a catalyst will be understood to refer to the rate of conversion of ammonia at a given partial pressure for a given amount of catalyst over a given period of time at a particular temperature and overall pressure. The units used to define the activity of a heterogeneous catalyst are mole of ammonia converted per gram of catalyst (including substrate if present) per second (or mol. $g^{-1}\ s^{-1}$).

The expression "in fluid flow communication" will be understood to mean that piping or other suitable conduits will be used to convey fluid from one specified location to another. During passage between the two locations, the fluid may flow through one or more other units which may be designed and/or arranged to alter the physical condition, e.g., temperature (e.g., a heat exchanger) and/or pressure (e.g., a compressor or a pump) of the fluid, or the composition of the fluid through reaction of components within the fluid (e.g., a catalytic reactor). The expression "in direct fluid flow communication" will be understood to mean that the fluid flows directly from the one location to the other, i.e., does not flow through another such unit during its passage and hence there is essentially no change to the composition or physical condition of the fluid.

The term "super-atmospheric pressure" will be understood to mean a pressure that is significantly higher than atmospheric pressure, such as a pressure of at least 5 bar, e.g., a pressure of at least 10 bar, or of at least 20 bar or of at least 30 bar. Typically, the pressure is no more than 60 bar.

The term "upstream" will be understood to mean in the opposite direction to the flow of fluid during normal operation. The term "downstream" will be interpreted accordingly.

The heated ammonia gas feed of the present invention is typically generated from liquid ammonia which may be supplied at ambient pressure from either a pipeline or, more typically, a refrigerated storage tank. Water is often added to ammonia to prevent stress corrosion cracking in the storage tanks, trucks and ships used to transport ammonia. The presence of water in the feed ammonia turns the feed into a multi-component stream, and the evaporation of the feed stream would then require a higher temperature to achieve complete evaporation.

A typical composition of the ammonia feed is shown in Table 1.

TABLE 1

| Component | Composition |
| --- | --- |
| Ammonia | 99.5-99.8 wt % |
| Maximum water content | 0.5 wt % |
| Minimum water content | 0.2 wt % |
| Oil | 5 ppm max |
| Inerts (e.g., Ar) | <10 ppm |
| Iron | <1 ppm |

Oil may be present in the ammonia due to a boil-off gas compressor used for the ammonia storage, either at the local storage tank, production location, or any other storage tank in between. The presence of oil is an issue because it presents a blockage and/or contamination risk. This may lead to malperformance in the heat exchangers or reduced catalyst activity in the reactors. Therefore, if present, the oil may need to be removed in some way. In this regard, the oil can be removed by passing the liquid ammonia through a bed of activated carbon. However, in preferred embodiments, the catalyst used in the adiabatic reaction unit will crack the oil into shorter chain hydrocarbons which may react with any water present to form carbon monoxide, hydrogen, and methane.

Inert gases are not expected to be an issue, other than they could end up in the product hydrogen. In this regard, helium can be present in ammonia derived from natural gas but ammonia from renewable hydrogen will not contain helium.

The liquid ammonia is typically taken from storage and pumped from the storage pressure (e.g., about 1 bar) to a pressure in a range from about 5 bar to about 60 bar, e.g., from about 10 bar to about 50 bar such as from about 10 bar to about 30 bar or from about 40 bar to about 50 bar. The temperature of the liquid ammonia increases slightly from the storage temperature (e.g., about −34° C.) to about −32° C. If liquid ammonia is taken from a pipeline, the temperature of the liquid ammonia is usually higher, e.g., about +10° C.

The pumped liquid ammonia (at super-atmospheric pressure) is then typically pre-heated to its boiling point, ideally by appropriate heat integration within the process. Preferably, part of the pre-heating is achieved using a heat transfer circuit where the heat, e.g., from the intercooling and aftercooling of a PSA off gas compressor, is recovered using a heat transfer fluid such as an aqueous solution of a glycol, e.g., an aqueous solution comprising from about 50 wt. % to about 60 wt. % of a glycol such as ethylene glycol or propylene glycol, optionally together with heat from the flue gas and/or cracked gas, and used to heat the liquid ammonia. If no such integration is possible, such as if the compressor is not running, then heat from an external source, such as an electric heater, could be required to preheat the ammonia.

The pre-heated liquid ammonia is typically then evaporated, and the resultant ammonia gas heated further prior to being fed to the adiabatic reaction unit. In this regard, the ammonia gas is typically superheated, i.e., heated to a temperature above its boiling point, to a temperature of more than 350° C. to ensure a useful rate of reaction in the adiabatic reaction unit.

The duty for the evaporation and further heating of the pre-heated liquid ammonia may be provided by heat exchange with the cracked gas, the flue gas or a combination of both the cracked gas and the flue gas. In preferred embodiments, the cracked gas is used to heat and evaporate the pre-heated liquid ammonia by heat exchange and then the ammonia gas is further heated by heat exchange with the flue gas.

The use of the adiabatic reactors unit enables some of the ammonia to be cracked before entering the catalyst-filled reactor tubes of the furnace. The mole fraction of ammonia in the gas passing through the adiabatic reactors is typically reduced by at least 20%, e.g., by at least 25%, or by at least 30%, or by at least 35%, or by at least 40%, and/or up to about 50%. Put another way, the mole fraction of ammonia may be reduced from 1 (or almost 1) in the heated ammonia gas to an amount in a range from about 0.5 to about 0.8, or to an amount in a range from about 0.5 to about 0.7, or to an amount in a range from about 0.55 to about 0.65 in the partially cracked ammonia gas. In some embodiments, the mole fraction for ammonia in the partially cracked ammonia gas is in a range from about 0.58 to about 0.62, e.g., about 0.6.

The adiabatic reactors are incorporated into the design of the process to improve overall efficiency, specifically by using the heat available in the flue gas to provide heat to the adiabatic cracking process within the reactors. In this regard, the temperatures around the adiabatic reactors are typically optimized to maximise the recovery of heat from the flue gas while avoiding temperatures greater than about 660° C. because of concerns regarding the materials.

The key design parameter for the adiabatic reactors are the inlet temperatures. A higher inlet temperature allows greater conversion in the unit since the ammonia cracking reaction is endothermic. However, higher temperatures put greater demands on the materials of construction and the catalyst. The inlet temperature to each adiabatic reactor is therefore typically in a range from about 350° C. to about 800° C. with the inlet temperature to the first adiabatic reactor being in a range from about 500° C. to about 700° C., or from about 550° C. to about 650° C. In addition, the inlet temperature to the further adiabatic reactor is in a range from about 400° C. to about 600° C., or from about 450° C. to about 550° C.

The invention requires the use of at least two adiabatic reactors, each reactor comprising a catalyst bed. One or more further adiabatic reactors may be included, bringing the total number of adiabatic reactors up to e.g., three, four, five or six, with interstage heating as appropriate. The further reactors may be arranged in series or in parallel or in a combination of series and parallel depending on the requirements of the process. However, in preferred embodiments, the adiabatic reaction unit will have two such reactors arranged in series with interstage heating of the intermediate partially cracked ammonia gas, preferably by heat exchange against the cracked gas and/or the flue gas.

Each adiabatic reactor has a bed comprising at least one catalyst suitable for cracking ammonia. Any conventional ammonia cracking catalyst may be used in the bed of the or each adiabatic reactor.

A large number of metals are known in the art to catalyze the cracking of ammonia. These metals include transition metals such those in Group 6 of the Periodic Table, e.g., chromium (Cr) and molybdenum (Mo); Group 8, e.g., iron (Fe), ruthenium (Ru) and osmium (Os); Group 9, e.g., cobalt (Co), rhodium (Rh) and iridium (Ir); Group 10, e.g., nickel (Ni), palladium (Pd) and platinum (Pt); and Group 11, e.g., copper (Cu), silver (Ag) and gold (Au). Metalloids such as tellurium (Te) may also be used.

The activity of some of these metals as catalysts for ammonia cracking has been reported by Masel et al (Catalyst Letters, vol. 96, Nos 3-4, July 2004) to vary in the following order:

Ru>Ni>Rh>Co>Ir>Fe>>Pt>Cr>Pd>Cu>>Te

The metals may be unsupported but are usually supported on a suitable support (or substrate), typically a metal oxide support such as silica ($SiO_2$), alumina ($Al_2O_3$), zirconia ($ZrO_2$) or a mixed metal oxide support such as spinel ($MgAl_2O_4$) or perovskite ($CaTiO_3$). Alternatively, the metal(s) may be supported on a zeolite.

As would be understood by the skilled person, the activity of a supported metal catalyst will typically depend in part on the loading of the catalytically active metal on the support. In this regard, the loading of the metal will vary according to the specific requirements but will typically be in a range from about 0.1 wt % to about 70 wt %. The loading may be towards the lower end of the range, e.g., from about 0.1 wt % to about 10 wt % or from about 0.2 wt % to about 5 wt %, for the more active metals, e.g., ruthenium. For less active metals, e.g., nickel, the loading may be towards the upper end of the range, e.g., from about 20 wt % to about 65 wt %.

Supported metal catalysts may be unpromoted or may be promoted with at least one other metal, e.g., one or more Group 1 metals, e.g., lithium (Li), sodium (Na) and potassium (K); Group 2 metals, e.g., magnesium (Mg) and calcium (Ca), or Group 13 metals, e.g., aluminum (Al), to improve activity as is well known in the art.

Any conventional catalysts known for ammonia cracking may be used in the present invention. Suitable catalysts are disclosed in US2015/0217278A, Masel et al (above), Lamb et al (Int. J. Hydrogen Energy, 44 (2019) pp 3726-3736) and Boisen et al (J. Catalysis 230 (2005) pp 309-312).

Bimetallic catalysts, or catalysts containing two catalytically active metals, are also suitable for use with the present invention. Examples include the composite metal or metal alloys or metal nanoclusters supported on perovskites, composite oxides or nitrides, or mixed oxides or mixed nitrides disclosed in US2021/0001311A such as CoNi—MgSrCeO$_4$ and 1 wt % K—CoNi—MgSrCeO$_4$.

The catalyst(s) of the present invention typically comprise(s), e.g., contain(s) or consist(s) of, at least one metal-based catalyst. The catalytically active metal is typically selected from the transitional metals of the Periodic Table. Suitable transition metal-based catalysts have an activity at a temperature in the range of 475° C. to 600° C. suitable to achieve a reaction rate of at least 0.2 times, or at least 0.5 times, or at least equal to, or at least twice, or at least three times, or at least four times, or at least five times, the rate calculated according to equation 9 proposed by Lamb et al, i.e., $$r = 8.73 \exp[-76710/RT] \cdot (P_{NH3})^{0.28} \cdot (P_{H2})^{-0.42} \cdot (1-\beta^2)$$

where:
"r" is the reaction rate (or "activity") of the catalyst;
"RT" is the ideal gas constant "R" (8.314 J mol$^{-1}$ K$^{-1}$) multiplied by the temperature "T" in Kelvin;
$P_{NH3}$ is the partial pressure of ammonia;
$P_{H2}$ is the partial pressure of hydrogen;
β is define in the paper (see equation 5 proposed by Lamb et al) as $$\beta = \frac{1}{K_e}\left(\frac{P_{N_2}^{0.5} P_{H_2}^{1.5}}{P_{NH_3}}\right)$$

$P_{N2}$ is the partial pressure of nitrogen; and
$K_e$ is the equilibrium constant for the reaction (see equations 6 & 7 proposed by Lamb et al).

The Inventors have realized that equation 9 of Lamb et al may be extrapolated to temperatures outside 475° C. to 600° C., e.g., in the range from 450° C. to 700° C.

Transition metals that may be particularly suitable for use as the predominant catalytically active metal(s) of the catalyst(s) in the catalyst bed of the adiabatic reactors are selected from chromium, manganese, iron, cobalt, nickel, ruthenium and copper, e.g., iron, cobalt, nickel and ruthenium. The Inventors understand that nickel and ruthenium are typically the most suitable catalytically active metals for use in the catalyst bed(s) of the adiabatic reaction unit.

The term "ruthenium-based catalyst" refers to a catalyst containing ruthenium as the sole (or at least predominant) catalytically active metal, i.e., the metal responsible for catalyzing the cracking reaction. Ruthenium may be the only metal in the catalyst or alternatively one or more other metals may be present, e.g., in a material supporting the ruthenium. The terms "nickel-based catalyst" and "iron-based catalyst" are intended to be interpreted accordingly.

Suitable ruthenium-based catalysts and nickel-based catalysts may be supported, for example, on alumina (as disclosed in Lamb et al or Masel et al) or spinel (as disclosed in Boisen et al), optionally promoted with a Group 1 or Group 2 metal.

Ruthenium-based catalysts tend to be more active than nickel-based catalysts but are more expensive. Therefore, further optimization is possible by selection of the catalyst and, if more than one type of catalyst is used, by the ordering of layers of the catalysts within the bed(s) of the adiabatic reaction unit. Suitable catalysts include the conventional nickel-based or ruthenium-based catalysts for cracking ammonia.

In embodiments having two adiabatic reactors in series, the catalyst bed of the first reactor typically comprises, e.g., contains or consists of, a single layer of a first catalyst, e.g., a nickel-based catalyst, and the catalyst bed of the second reactor typically comprises, e.g., contains or consists of, an upstream layer of a second catalyst, e.g., a nickel-based catalyst, that typically has a similar activity to the first catalyst, and a downstream layer of a third catalyst, e.g., a ruthenium-based catalyst, that is typically more active than the first and second catalysts.

In these embodiments, the first and second catalysts may be identical. Alternatively, the first and second catalysts may be different, e.g., contain different catalytically active metals or contain the same catalytically active metals but on different supports or contain the same catalytically active metals on the same supports but at different loadings.

The volume of the upstream layer of the second catalyst in the bed of the second reactor may be from about 40% to about 90%, e.g., from about 50% to about 70% or about 60%, of the total volume of the bed. In the absence of another layer of catalyst, the volume of the downstream layer of the third catalyst in the bed of the second reactor may be from about 10% to about 60%, e.g., from about 30% to about 50%, or about 40%, of the total volume of the bed.

The Inventors have realized that ruthenium-based catalysts are capable of cracking hydrocarbon oils into shorter hydrocarbons such as methane, together with carbon monoxide and hydrogen. Therefore, the use of these catalysts in the adiabatic reaction unit can eliminate the need for a dedicated unit upstream for removing the oil from the liquid ammonia.

The reactor tubes of the furnace are also filled with ammonia cracking catalyst(s). Any of the conventional ammonia-cracking catalysts mentioned above may be used in the reactor tubes. However, as for the adiabatic reactors, particularly suitable catalysts for the reactor tubes include nickel-based catalysts and ruthenium-based catalysts.

In some embodiments, particularly embodiments in which the cracking reaction is taking place at higher temperatures, the reactor tubes may be filled with a less active catalyst, e.g., a nickel-based catalyst, as the sole catalyst in the tubes. Less active catalysts tend to be cheaper than the more active catalysts and, thus, this arrangement helps reduce the overall capital cost.

The reactor tubes may, however, be filled with at least two different ammonia cracking catalysts having different activities.

In these embodiments, a more active catalyst, e.g., a ruthenium-based catalyst, may be located in the tubes downstream of a less active catalyst, e.g., a nickel-based catalyst, to ensure that the cracking reaction approaches equilibrium.

Alternatively, a more active catalyst, e.g., a ruthenium-based catalyst, may be located upstream of a less active catalyst, e.g., a nickel-based catalyst, to help control the inner wall temperature of the reactor tubes in the region where the temperature and partial pressure of ammonia is highest, thereby controlling nitriding of the tubes. The catalysts may be layered in this way in preferred embodiments to use the endotherm of reaction inside the tubes to keep the tube metal cool in the region where the combustion is most intense on the outside of the tubes. Since ruthenium is more catalytically active than nickel, it creates a stronger endotherm that keeps the inner tube wall cooler in the region of high ammonia concentration on the process side which protects the tubes from excessive nitriding caused by high ammonia concentration and high temperatures.

In these alternate embodiments, a second more active catalyst, e.g., another ruthenium-based catalyst, may be located downstream of the less active catalyst to ensure that the cracking reaction approaches equilibrium.

The activity of the more active catalyst(s) is typically at least 50% greater than that of the less active catalyst. However, the difference in relative activities is usually substantially more than 50%. In this regard, the activity of the more active catalyst(s) is usually greater than the activity of the less active catalyst by a factor of at least two (i.e., double), or at least three, or at least four, or at least five. In some embodiments, the activity of the more active catalyst is greater than the activity of the less active catalyst by a factor of at least ten (i.e., by one order of magnitude) or by a factor of at least fifteen.

In some preferred embodiments, the catalyst in the upstream layer of the tubes is a ruthenium-based catalyst and the catalyst in the downstream layer is a nickel-based catalyst. Where a third catalyst is present in these embodiments downstream of the nickel-based catalyst, that catalyst is preferably a ruthenium-based catalyst although the catalyst may be a different ruthenium-based catalyst to the first catalyst, e.g., the catalyst have a different support and/or catalyst loading and/or, if both are promoted, then promoted with a different metal.

The catalysts in the reactor tubes may be the same or different to the catalysts used in the adiabatic reaction unit.

It is also known that at higher temperatures, catalyst sintering reduces the activity and life of the catalyst. In this regard, the skilled person would be aware of the need to balance the improved conversion against the higher vessel costs and shorter catalyst life.

As mentioned above, water is usually present in the ammonia as a contaminant. The water may be removed from the ammonia in which case catalysts which do not tolerate water, e.g., iron-based catalysts, may be used in the adiabatic reaction unit and/or reactor tubes. However, water is not removed in preferred embodiments to save capital and operational costs and to reduce energy consumption. In these embodiments, catalysts that cannot tolerate water, e.g., iron-based catalysts, are not typically used. Instead, the catalysts in the reactor tubes would be able to tolerate up to 1 mol. % water in the ammonia feed. Such catalysts include nickel-based and ruthenium-based catalysts.

The combustion process in the furnace is preferably at least partially internally fueled, i.e., at least part of the fuel is either ammonia or an off gas generated during recovery of hydrogen from the cracked gas or a mixture of the two. However, a trim fuel such as $C_1$ to $C_3$ hydrocarbons or natural gas may be used as required although using a hydrocarbon trim fuel will increase the carbon intensity of the process and thus it is generally desirable to minimize the use of such a trim fuel while maintaining or even improving the recovery of hydrogen.

The oxidant gas is typically air but may be an oxygen-enriched gas or pure oxygen as appropriate.

The partially cracked ammonia may be fed to the catalyst-filled tubes of the furnace at a temperature up to about 800° C. provided the material of the reactor walls can withstand the higher temperatures. For lower temperature cycles, the feed is typically at a temperature in a range from about 400° C. to about 600° C., or from about 450° C. to about 550° C., e.g., at about 500°. For higher temperature cycles, the feed may be at a temperature in the range of about 500° C. to about 800° C., or from about 600° C. to about 700° C., e.g., at about 650°.

The cracking temperature and pressure typically dictate that the ammonia slip in the reactor tubes is no more than 3 mol. %, e.g., from about 0.5 mol. % to about 1.5 mol. %.

The heat from the cracked gas and the flue gas is then used to heat the feed streams to the adiabatic reactors and furnace, thereby reducing the overall energy consumed by the process. In this regard, the temperature of the cracked gas will depend on the cycle being operated.

In lower temperature cycles, the temperature of the cracked gas may be up to about 700° C., e.g., typically from about 550° C. to about 700° C., or from about 600° C. to about 650° C. The temperature of the flue gas may be up to about 750° C. at its highest point. However, the temperature drops due to heat leak and is typically from about 600° C. to about 700° C. at the point where its heat can be utilized effectively.

In higher temperature cycles, the temperature of the cracked gas may be up to about 750° C., e.g., typically from about 650° C. to about 750° C., or from about 675° C. to about 725° C. The temperature of the flue gas may be up to about 840° C. at its highest point. However, the temperature drops due to heat leak and is typically from about 700° C. to about 800° C. at the point where its heat can be utilized effectively.

At least some of the duty required to heat the partially cracked gas generated in the adiabatic reaction unit to the feed temperature of the catalyst-filled reactor tubes of the furnace is typically provided by heat exchange with the cracked gas. In preferred embodiments, the cracked gas is used directly to provide this heating duty. In other words, the cracked gas is not typically used elsewhere, e.g., to heat another process fluid, before heating the partially cracked gas. Some of this heating duty may be provided in another way, e.g., by heat exchange with the flue gas. However, the majority, i.e., over 50% of this heating duty is typically provided by the cracked gas. In preferred embodiments, at least 75%, or at least 90%, or all, of this heating duty is provided by the cracked gas.

Due to the high ammonia concentration in the feed gas, the cracking reactor vessels, e.g., the adiabatic reactors and the reactor tubes in furnace, are typically constructed from materials resistant to ammonia and/or nitriding, particularly where higher cracking temperatures are used. Suitable materials include nickel-based alloys comprising at least 40 wt. % or at least 50 wt. % nickel. Such alloys typically have no more than 90 wt. %, or no more than 80 wt. % nickel. The alloys will typically comprise one or more other metals selected from chromium, cobalt, molybdenum and iron.

Specific examples of suitable nickel-based alloys include UNS N06600, N06625, N06601, N06617, N06025, N06230, N07214, N08811. In some embodiments, austenitic nickel-chromium based superalloys such as Inconel may be used.

The unified numbering system (UNS) is an alloy designation system that is widely accepted in North America. Each UNS number relates to a specific metal or alloy and defines its specific chemical composition, or in some cases a specific mechanical or physical property.

Other suitable materials include cobalt-based alloys such as UNS R30188. In addition, high temperature alloys that are less resistant to ammonia nitriding, such as UNS N08811 or cast alloys such as HPNb, HP Micro-Alloyed, MA-1 (MetalTek International, USA), may be suitable, particularly when surface modified or coated by a corrosion resistant layer such as aluminization; aluminization and then pre-oxidation; or a ceramics coating. Nitriding resistant alloys can also be used with surface modification or coating for improved performance.

In preferred embodiments, the composition of the ammonia is typically at least substantially unchanged from the liquid ammonia in storage to the heated ammonia gas being fed to the adiabatic reaction unit. Oil present in the liquid ammonia may be removed at some point prior to partial cracking of the ammonia although, in embodiments where the ammonia feed to the adiabatic reaction unit encounters a ruthenium-based catalyst first, the oil does not need to be removed. In these embodiments, water is not typically removed so any water present in the liquid ammonia will also be present in heated ammonia gas.

The cracked gas is cooled during the heat exchange with the partially cracked gas. The cooled cracked gas is then typically further cooled by providing at least part of the heating duty required to generate the heated ammonia gas from liquid ammonia. After cooling, hydrogen may be recovered as product from the cracked gas. Recovery may be achieved in pressure swing adsorption (PSA) process or by using one or more selectively permeable membranes, or by way of a combination of PSA and membrane separation. In preferred embodiments, hydrogen recovery is achieved in a PSA process alone, i.e., without use of membrane separation.

In embodiments using a PSA process, an PSA off gas comprising nitrogen gas, residual ammonia and residual hydrogen is generated. The PSA off gas is typically split into two portions. A first portion of the PSA off gas is typically compressed in a compression unit and recycled to the PSA process to improve hydrogen recovery. The second portion is typically pre-heated and then fed as fuel to the furnace.

Several factors influence the carbon intensity of cracking processes and two of these factors are the amount of ammonia allowed to slip through the cracker and nature of the fuel combusted in the cracker, specifically whether a hydrocarbon such as natural gas is used, and if so, how much is used. The inventors have discovered that, for a given amount of ammonia slip and natural gas combusted in the cracker, the overall carbon intensity of the process can be reduced if the cracked gas (and not the flue gas) is used to provide at least some of the duty required to heat the partially cracked gas to the feed temperature of the cracker.

Aspects of the invention include:

1. A process for cracking ammonia comprising:
  providing a heated ammonia gas at super-atmospheric pressure;
  feeding the heated ammonia gas at a first temperature (T1) to a first adiabatic reactor comprising a catalyst bed to crack a portion of the ammonia and produce an intermediate partially cracked ammonia gas;
  heating the intermediate partially cracked ammonia gas to produce a heated intermediate partially cracked ammonia gas;
  feeding the heated intermediate partially cracked ammonia gas, or a heated intermediate partially cracked ammonia gas derived therefrom, at a second temperature (T2) which is lower than the first temperature (T1) to a further adiabatic reactor comprising a catalyst bed to crack a further portion of the ammonia and produce a partially cracked ammonia gas;
  combusting fuel with an oxidant gas in a furnace to heat catalyst-containing reactor tubes and form a flue gas; and
  feeding the partially cracked ammonia gas to the catalyst-containing reactor tubes to cause cracking of further ammonia to produce a cracked gas comprising hydrogen gas, nitrogen gas and residual ammonia.

2. A process according to #1 wherein the catalyst bed of the first adiabatic reactor comprises a nickel-based catalyst.

3. A process according to #1 or #2 wherein the first temperature (T1) is in a range from about 550° C. to about 650° C.

4. A process according to any of #1 to #3 wherein the catalyst bed of the further adiabatic reactor comprises at least one catalyst selected from a nickel-based catalyst and a ruthenium-based catalyst.

5. A process according to any of #1 to #4 wherein the second temperature (T2) is in a range from about 450° C. to about 550° C.

6. A process according to any of #1 to #5 wherein at least some, preferably all, of the duty required to heat the intermediate partially cracked gas is provided by heat exchange with the flue gas.

7. A process according to #6 wherein a part of the duty required to provide the heated ammonia gas is provided by heat exchange with the flue gas upstream of the heat exchange with the intermediate partially cracked gas relative to the flow of flue gas.

8. A process according to any of #1 to #7 wherein the partially cracked ammonia gas is heated to produce a heated partially cracked ammonia gas prior to being fed to the catalyst-containing reactor tubes of the furnace.

9. A process according to #8 wherein at least some, preferably all, of the duty required to heat the partially cracked ammonia gas is provided by heat exchange with the cracked gas.

10. A process according to any of #1 to #9 comprising:
pumping liquid ammonia containing at least 0.1 mol % water to produce a pumped liquid ammonia;
pre-heating the pumped liquid ammonia to produce a pre-heated liquid ammonia;
vaporizing the pre-heated liquid ammonia to produce an ammonia gas; and
heating the pressurized ammonia gas to produce the heated ammonia gas at super-atmospheric pressure,
wherein the water from the liquid ammonia is present in the heated ammonia gas.

11. A process according to #10 wherein the water is present in the heated ammonia in an amount of no more than 1 mol %.

12. A process according to #10 or #11, wherein at least some, preferably a majority, i.e., over 50%, of the heating duty required to provide the heated ammonia gas is provided by heat exchange with the cracked gas downstream of the heat exchange with the partially cracked ammonia gas relative to the flow of the cracked gas.

13. A process according to any of #1 to #12 wherein the catalyst-filled tubes of the furnace and the catalyst beds of the adiabatic reactors contain no iron-based catalyst.

14. A process according to any of #1 to #13 further comprising:
after cooling, e.g., to below 60° C., for example to about 50° C., recovering hydrogen from the cracked gas in a hydrogen recovery unit to produce a hydrogen gas produce and an offgas comprising nitrogen gas, residual hydrogen gas and residual ammonia gas;
heating at least a portion of the offgas to produce heated off gas; and
feeding the heated offgas as at least part of the fuel to the furnace.

15. A process according to #14 wherein all of the off gas is fed as fuel to the furnace.

16. A process according to #14 or #15 comprising:
dividing the offgas into a first portion and a second portion, wherein the first portion is heated and fed to the furnace; and
compressing the second portion of the offgas to produce a compressed offgas and recycling the compressed offgas to the hydrogen recovery unit for further hydrogen recovery.

17. An apparatus for cracking ammonia comprising:
a first adiabatic reactor for partially cracking heated ammonia gas at super-atmospheric pressure, the reactor comprising an inlet for heated ammonia gas, a catalyst bed having an upstream end in fluid flow communication with the inlet and a downstream end in fluid flow communication with an outlet for intermediate partially cracked ammonia gas;
a further adiabatic reactor for cracking heated intermediate partially cracked ammonia gas, or heated intermediate partially cracked ammonia gas derived therefrom, the reactor comprising an inlet in fluid flow communication with the outlet of the first adiabatic reactor, a catalyst bed having an upstream end in fluid flow communication with the inlet and a downstream end in fluid flow communication with an outlet for partially cracked ammonia gas;
a furnace comprising:
a radiant section comprising at least one inlet for fuel and oxidant gas in fluid flow communication with at least one burner, catalyst-containing reactor tubes having upstream ends in fluid flow communication with the outlet of the further adiabatic reactor and downstream ends in fluid flow communication with an outlet for cracked gas; and
a convection section in fluid flow communication with the radiant section comprising an outlet for flue gas,
a first heat exchanger for heating ammonia gas by heat exchange with flue gas in the convection section of the furnace, the first heat exchanger comprising an inlet for ammonia gas and an outlet in direct fluid flow communication with the inlet of the first adiabatic reactor,
a second heat exchanger for heating intermediate partially cracked ammonia gas by heat exchange with flue gas in the convection section of the furnace, the second heat exchanger having an inlet in direct fluid flow communication with the outlet of the first adiabatic reactor and an outlet in fluid flow communication with the inlet of the further adiabatic reactor,
wherein the first heat exchanger is located upstream of the second heat exchanger within the convection section of the furnace relative to the flow of flue gas.

18. An apparatus according to #17 wherein the catalyst bed of the first adiabatic reactor comprises a nickel-based catalyst.

19. An apparatus according to #17 or #18 wherein the catalyst bed of the further adiabatic reactor comprises a catalyst selected from a nickel-based catalyst and a ruthenium-based catalyst.

20. An apparatus according to any of #17 to #19 comprising a further heat exchanger (or "economizer") arranged to heat partially cracked ammonia gas by heat exchange with cracked gas located between the further adiabatic reactor and the radiant section of the furnace.

21. An apparatus according to #20 wherein the further heat exchanger is a shell-and-tube style heat exchanger.

22. An apparatus according to #21 wherein the shell side of the heat exchanger is in direct fluid flow communication with the outlet of the radiant section of the furnace.

23. An apparatus according to any of #17 to #22 comprising:
- a hydrogen recovery unit, preferably a PSA unit, for recovering hydrogen gas from cracked gas comprising:
    - a first inlet in fluid flow communication with the cracked gas outlet of the radiant section of the furnace;
    - a first outlet for hydrogen gas; and
    - a second outlet for offgas comprising nitrogen gas, residual ammonia gas and residual hydrogen gas in fluid flow communication with the at least one inlet for fuel of the radiant section of furnace, wherein the apparatus comprises an offgas heater arranged for heating offgas and located between the second outlet of the hydrogen recovery unit and the at least one inlet for fuel of the radiant section of the furnace.

24. An apparatus according to #23 comprising:
- a compression unit for compressing offgas, said compressor comprising:
    - an inlet in fluid flow communication with the second outlet of the hydrogen recovery unit; and
    - an outlet in fluid flow communication with the first inlet of the hydrogen recovery unit, wherein the apparatus comprises a valve arrangement to control flow of offgas to the compression unit and the offgas heater.

25. An apparatus according to any of #17 to #24 wherein the catalyst-filled tubes of the furnace and the catalyst beds of the adiabatic reactors contain no iron-based catalysts.

Figure 1:
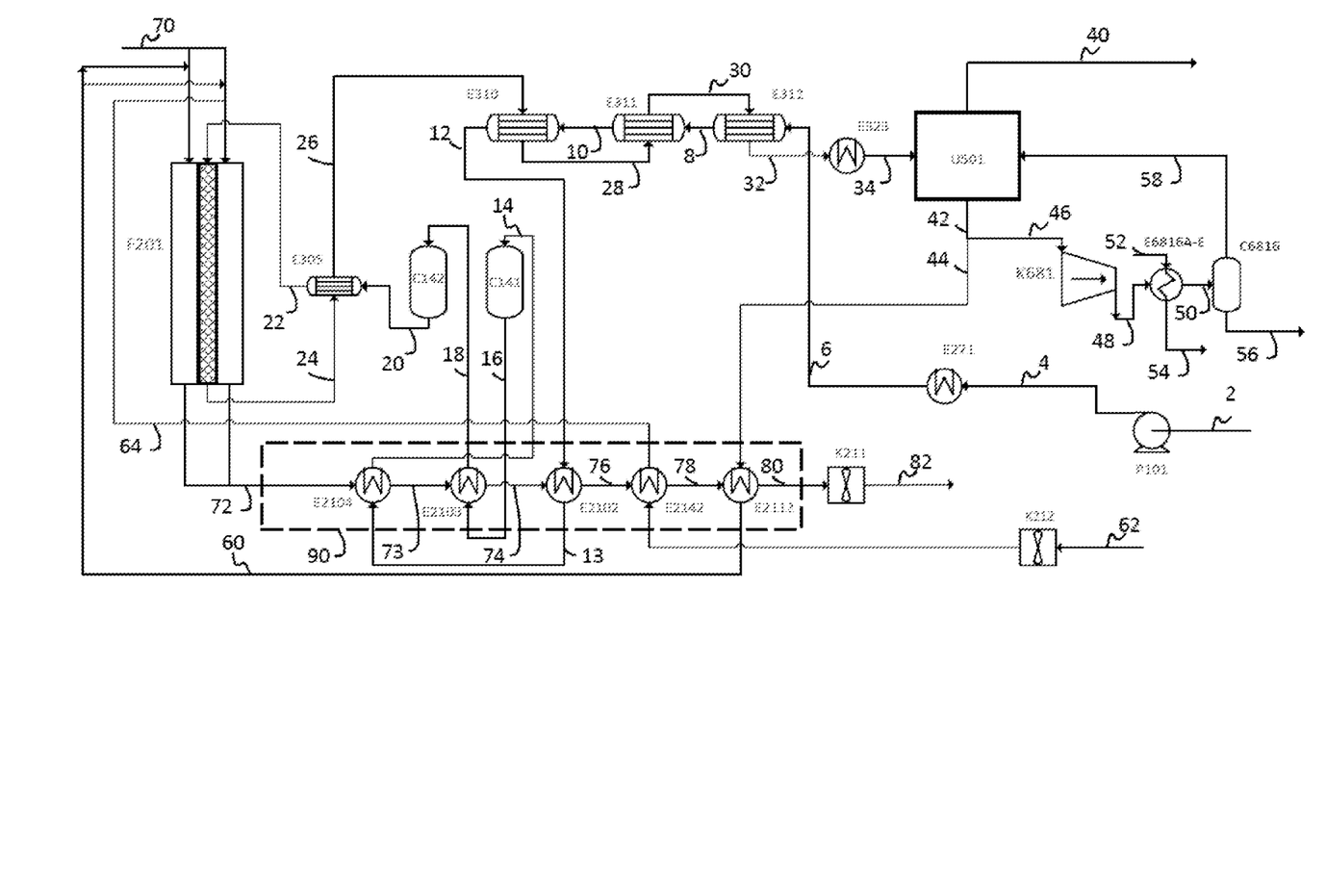
FIG. 1 is a simplified flowsheet for one embodiment of the present invention.

The invention will now be described by way of example only with reference to the FIGURE.

In FIG. 1, a stream 2 of liquid ammonia at about −32° C. is removed from storage (not shown) and fed to a pump P101 where it is pumped to produce a stream 4 of pressurised liquid ammonia at a pressure of about 46 bar which is pre-heated by heat exchange with a heat transfer fluid which in this case is an aqueous solution of a glycol, typically about 55 wt. % ethylene glycol or propylene glycol, in heat exchanger E271 to produce stream 6 of pre-heated liquid ammonia at about 55° C. An electric heater may be used to ensure that the temperature of the glycol solution being fed to the heat exchanger E271 is sufficient to pre-heat the liquid ammonia to the required temperature.

The pre-heated liquid ammonia in stream 6 is further heated by heat exchange in heat exchanger E312 to produce a stream 8 of further heated liquid ammonia. The further heated liquid ammonia in stream 8 is then evaporated by heat exchange in heat exchanger E311 to produce a stream 10 of ammonia vapor. The ammonia vapor in stream 8 is then superheated by heat exchange in heat exchanger E310 to produce a stream 12 of heated ammonia gas at about 260° C.

The heated ammonia gas in stream 12 is further heated by heat exchange in heat exchanger E2102 to produce a stream 13 of further heated ammonia gas at about 490° C. For convenience, heat exchanger E2102 is indicated as a single unit. However, there may be in reality two separate heat exchangers with a selective catalytic reactor (SCR) located in between.

The further heated ammonia gas in stream 13 is then heated by heat exchange in heat exchanger E2104 to produce a stream 14 of superheated ammonia gas at about 600° C. and about 45 bar. Heat exchanger E2104 is the "first heat exchanger" as defined in the claims.

The superheated ammonia gas in stream 14 is then fed to a first adiabatic reactor vessel C141 and passed through a bed of nickel-based catalyst. Some of the ammonia gas is cracked over the catalyst to form a stream 16 of intermediate gas that contains some cracked ammonia. The mole fraction of ammonia in the gas passing through the first adiabatic reactor vessel C141 drops from almost 1 to about 0.75.

The intermediate gas is at about 450° C. before being heated by heat exchange in heat exchanger E2103 to produce a stream 18 of superheated intermediate gas. Heat exchanger E2103 is the "second heat exchanger" as defined in the claims.

Stream 18 then fed at about 500° C. to a second adiabatic reactor vessel C142 and passed through a bed containing an upstream layer of nickel-based catalyst and a downstream layer of a ruthenium-based catalyst to produce a stream 20 of partially cracked ammonia gas at about 380° C. The mole fraction of ammonia in the gas passing through the second adiabatic reactor vessel C142 drops from about 0.75 to about 0.6.

The catalyst bed of the second adiabatic reactor vessel C142 has two layers—a layer of nickel-based catalyst over a layer of ruthenium-based catalyst to use the heat more efficiently and hence maximize ammonia conversion. The catalyst volumes are also optimized, i.e., minimizing the volume of the ruthenium-based catalyst by limiting the exit temperature of the second adiabatic reactor vessel. The Inventors found that reducing this temperature below about 380° C. increases the volume required of the ruthenium-based catalyst without any additional benefit.

The ruthenium-based catalyst is the same in both the first and second adiabatic reactor vessels. However, different ruthenium-based catalysts may be used.

The partially cracked ammonia in stream 20 is heated by heat exchange in a heat exchanger (or "economizer") E305 prior to being fed as stream 22 at a pressure of about 40 bar to catalyst-filled tubes in the radiant section F201 of a furnace (or reactor). Heat exchanger E305 is the "further heat exchanger" as defined in the claims.

Heating the feed to the tubes increases the amount of cracking that can be done with the heat from the burners by reducing the duty required to heat the partially cracked stream to the reaction temperature. The inlet temperature of the direct fired tube furnace is limited to about 500° C. to limit the inner wall temperature of the cracker tubes.

A stream 62 of air is passed through forced draft fan K212 before being pre-heated by heat exchange in heat exchanger E2142 to produce a stream 64 of pre-heated air. The pre-heated air of stream 64 is fed to the burners (not shown) of the furnace F201 alongside a stream 70 of natural gas as trim fuel. Pre-heating the air in this way helps reduce the fuel requirement.

The tubes in the radiant section F201 of the furnace are filled with two types of ammonia cracking catalysts in two different layers. A ruthenium-based catalyst is used in the first layer within each tube so that the faster reaction rate allows the metals temperature to be kept to within the design limit of about 660° C. The second layer in the tubes, downstream of the first layer, contains a lower cost but less active nickel-based catalyst.

A stream 24 of cracked gas exits the radiant section F201 of the direct fired tube furnace at about 640° C. and is then fed to economizer E305 (the "further heat exchanger" as defined in the claims) to provide the duty required to heat the partially cracked ammonia, thereby reducing the temperature of the cracked gas to about 520° C.

The economizer E305 is depicted as a shell-and-tube style heat exchanger with the partially cracked ammonia gas passing through the tubes and the cracked gas passing through the shell side. However, this arrangement could be reversed or indeed a different style of heat exchanger could be used.

A stream 26 of cracked gas is then fed from the economizer E305 to heat exchanger E310 to provide the duty required to superheat the ammonia gas, thereby further reducing the temperature of the cracked gas to about 380° C.

A stream 28 of cracked gas is then fed from heat exchanger E310 to heat exchanger E311 to provide the duty required to evaporate the further heated liquid ammonia, thereby reducing the temperature of the cracked gas even further to about 100° C.

A stream 30 of cracked gas is then fed from heat exchanger E311 to heat exchanger E312 to provide the duty required to further heat the heated pressurized liquid ammonia, thereby reducing the temperature of the cracked gas further again to about 60° C.

Each of the heat exchangers E310, E311 and E312 is depicted as an individual shell-and-tube style heat exchanger with the ammonia passing through the tubes and the cracked gas passing through the shell side. However, this arrangement could be reversed for at least one, e.g., all, of these heat exchangers. Alternatively, the heat exchangers could be combined into a single shell-and-tube style heat exchanger or indeed a different style of heat exchanger could be used.

A stream 32 of cracked gas from heat exchanger E312 is then cooled further by heat exchange with the heat exchange fluid in cooler E323 and then fed as stream 34 to PSA system U501 where it is separated into a stream 40 of hydrogen gas which is removed as product, and a stream 42 of PSA off gas comprising nitrogen gas, residual hydrogen gas and residual ammonia gas. The hydrogen gas in stream 40 may be fed to a hydrogen liquefaction unit (not shown) to produce liquid hydrogen.

All of the PSA off gas in stream 42 may be sent directly as fuel (stream 60) for combustion in the furnace F201. Alternatively, stream 42 may be divided into divided into two portions.

A first portion of the PSA off gas in stream 44 is heated by heat exchange in a heat exchanger E2112 to produce a stream 60 of warmed PSA off gas which is then fed to the burners in the furnace F201, together with air feed 64 and, optionally the natural gas feed 70 as required. A minimum amount of natural gas is used as trim fuel to provide the balance of fuel required in the fired section.

A second portion may be sent as stream 46 to a multistage compression unit K681 for compression. The compression unit K681 has five stages with an intercooler between each stage, together with an aftercooler following the last stage. Heat is recovered from the compressed gas in the intercoolers and the aftercooler by heat exchange with the heat transfer fluid. Heat may also be recovered from the lube oil used in the compression unit and, where a positive displacement compression unit is used, from the cylinder(s) of the compression unit using the heat transfer fluid.

For convenience, the intercoolers and aftercooler are indicated by a single heat exchanger (labelled as E6816A-E) that recovers heat from a stream 48 of compressed PSA offgas by heat exchange with a stream 52 of the heat transfer fluid to produce a stream 50 of cooled compressed PSA offgas and a stream 54 of warmed heat transfer fluid.

The heat transfer fluid warmed in the cooler E323 and in the intercoolers and aftercooler E6816A-E is then used to provide the duty required to preheat the liquid ammonia by heat exchange in heat exchanger E271.

The cooled compressed PSA off gas in stream 50 is fed to a phase separator C6816 in which any condensate is removed as stream 56. The compressed PSA off gas is then recycled to the PSA system U501 as stream 58 to recover further hydrogen. In this way, the recovery of hydrogen may be increased from about 85 mol. % (without the recycle) to about 95 mol. % (with the recycle).

As indicated above, the process can be operated without compression unit K681, resulting in lower hydrogen recovery in the PSA unit 501. Reducing hydrogen recovery will obviously result in less hydrogen gas product. However, reduced hydrogen recovery may still be desirable as the carbon intensity (CI) for the process is lowered as more hydrogen would be in the offgas thereby reducing the requirement for natural gas as trim fuel and reducing carbon dioxide emissions.

A stream 72 of flue gas at about 680° C. passes from the radiant section F201 to the convection section 90 of the furnace F201 where it first provides the duty required to further heat the ammonia from stream 13 in heat exchanger E2104 (the "first heat exchanger" as defined in the claims) thereby reducing the temperature of the flue gas which is then used (as stream 73) to provide the duty required to heat the intermediate gas from stream 16 in heat exchanger E2103 (the "second heat exchanger" as defined in the claims) thereby reducing the temperature of the flue gas further. Therefore, the flue gas provides heating duty in a direction co-current to the flow of feed gas to the radiant section F201 of the direct fired tube furnace.

The cooled flue gas is then used (as stream 74) to provide the duty required to further heat the ammonia gas in stream 12 in heat exchanger E2102 thereby reducing the temperature of the flue gas further.

The further cooled flue gas, which is still at a temperature of about 295° C., in stream 76 is then used to heat the air from stream 62 in heat exchanger E2142 thereby reducing the temperature of the flue gas further. The further cooled flue gas is then used (as stream 78) to provide the duty required to heat the PSA off gas from stream 44 in heat exchanger E2112 thereby cooling the flue gas further.

The cooled flue gas leaves the convection section 90 of the direct fired tube furnace F201 as stream 80 at a temperature of about 123° C., i.e., above the dew point of water, passes through an induced draft fan K211 and then leaves the process as stream 82. All of the practical energy has been extracted from the flue gas at this point which may now be vented to atmosphere, optionally after further processing if required depending on its composition.

Oil may be present in the liquid ammonia in an amount up to about 5 ppm from boil-off gas compressors (not shown) used with ammonia storage tanks (not shown), either at the location where the ammonia is produced, or onsite where the ammonia is cracked, or indeed anywhere in transit between the two sites. The presence of oil in the ammonia in known to cause difficulties as the ammonia cracking catalysts are thought typically not to tolerate the oil. At least some of the oil may removed by cracking in the catalyst bed of the first adiabatic reactor, particularly if ruthenium-based catalyst is used.

It may be desirable to remove at least some of the oil before the catalysts are exposed to the ammonia. In this regard, oil may be removed by passing the ammonia through a bed of activated carbon. If oil is to be removed from the ammonia upstream of the first adiabatic reactor, then an oil removal unit (not shown) may be located in stream 2 (i.e., in the feed line to the pump P101), in stream 4 (i.e., between pump P101 and glycol heater E271), in stream 6 (i.e., between glycol heater E271 and heat exchanger E312), in stream 8 (i.e., between heat exchangers E312 and E311) or in stream 10 (i.e., between heat exchangers E311 and E310).

The present invention will now be illustrated by the following non-limiting example.

EXAMPLE

The process depicted in FIG. 1 has been simulated by computer (Aspen Plus, ver. 10, Aspen Technology, Inc., Massachusetts, USA) for a plant designed to produce 30 tonnes/day hydrogen (stream 40).

The activities of the ruthenium-based catalyst and nickel-based catalyst in the adiabatic reactors and in the tubes were modelled using rate equation No. 9 given in Lamb et al (Int. J. Hydrogen Energy, 44 (2019) pp 3726-3736) as a basis. For the purpose of the simulation, it was assumed that the activity of the ruthenium-based catalyst conformed to the rate equation but that the activity of the nickel-based catalyst was 20% of that predicted by the rate equation.

The results are depicted in Table 2.

(stream 20) to the feed temperature of the catalyst-filled tubes of the cracker (F201) is to reduce the overall carbon intensity (CI) process.

While the invention has been described with reference to the preferred embodiments depicted in the FIGURE, it will be appreciated that various modifications are possible within the spirit or scope of the invention as defined in the following claims.

In this specification, unless expressly otherwise indicated, the word "or" is used in the sense of an operator that returns a true value when either or both of the stated conditions are met, as opposed to the operator "exclusive or" which requires only that one of the conditions is met. The word "comprising" is used in the sense of "including" and incorporates "consisting of" rather than to mean "consisting of" exclusively.

All prior teachings above are hereby incorporated herein by reference. No acknowledgement of any prior published document herein should be taken to be an admission or

TABLE 2

| Composition, mol % | 2 | 4 | 6 | 12 | 14 | 16 | 18 | 20 | 22 | 24 |
|---|---|---|---|---|---|---|---|---|---|---|
| Hydrogen | 0.00 | 0.00 | 0.00 | 0.00 | 0.00 | 18.95 | 18.95 | 30.98 | 30.98 | 73.93 |
| Nitrogen | 0.00 | 0.00 | 0.00 | 0.00 | 0.00 | 6.32 | 6.32 | 10.33 | 10.33 | 24.64 |
| Ammonia | 99.81 | 99.81 | 99.81 | 99.81 | 99.81 | 74.57 | 74.57 | 58.54 | 58.54 | 1.33 |
| Water | 0.19 | 0.19 | 0.19 | 0.19 | 0.19 | 0.17 | 0.17 | 0.15 | 0.15 | 0.10 |
| Oxygen | 0.00 | 0.00 | 0.00 | 0.00 | 0.00 | 0.00 | 0.00 | 0.00 | 0.00 | 0.00 |
| Argon | 0.00 | 0.00 | 0.00 | 0.00 | 0.00 | 0.00 | 0.00 | 0.00 | 0.00 | 0.00 |
| Carbon Dioxide | 0.00 | 0.00 | 0.00 | 0.00 | 0.00 | 0.00 | 0.00 | 0.00 | 0.00 | 0.00 |
| Methane | 0.00 | 0.00 | 0.00 | 0.00 | 0.00 | 0.00 | 0.00 | 0.00 | 0.00 | 0.00 |
| Ethane | 0.00 | 0.00 | 0.00 | 0.00 | 0.00 | 0.00 | 0.00 | 0.00 | 0.00 | 0.00 |
| Pentane | 0.00 | 0.00 | 0.00 | 0.00 | 0.00 | 0.00 | 0.00 | 0.00 | 0.00 | 0.00 |
| Butane | 0.00 | 0.00 | 0.00 | 0.00 | 0.00 | 0.00 | 0.00 | 0.00 | 0.00 | 0.00 |
| Pentane | 0.00 | 0.00 | 0.00 | 0.00 | 0.00 | 0.00 | 0.00 | 0.00 | 0.00 | 0.00 |
| Ethylene Glycol | 0.00 | 0.00 | 0.00 | 0.00 | 0.00 | 0.00 | 0.00 | 0.00 | 0.00 | 0.00 |
| Flowrate, kmol/hr | 447.7 | 447.7 | 447.7 | 447.7 | 447.7 | 512.5 | 512.5 | 564.3 | 564.3 | 882.8 |
| Flowrate, kg/hr | 7626.0 | 7626.0 | 7626.0 | 7626.0 | 7626.0 | 7626.0 | 7626.0 | 7626.0 | 7626.0 | 7626.0 |
| Pressure, bar (a) | 1.0 | 48.4 | 48.0 | 46.8 | 44.8 | 43.3 | 42.3 | 40.8 | 40.4 | 35.4 |
| Temperature, °C. | −33.7 | −32.1 | 53.0 | 250.0 | 600.0 | 447.0 | 500.0 | 377.0 | 500.0 | 639.0 |

| Composition, mol % | 26 | 34 | 44 | 40 | 60 | 70 | 64 | 72 | 76 | 82 |
|---|---|---|---|---|---|---|---|---|---|---|
| Hydrogen | 73.93 | 73.93 | 12.42 | 100.00 | 12.42 | 0.00 | 0.00 | 0.00 | 0.00 | 0.00 |
| Nitrogen | 24.64 | 24.64 | 82.79 | 0.00 | 82.79 | 1.00 | 76.60 | 78.22 | 78.22 | 78.22 |
| Ammonia | 1.33 | 1.33 | 4.47 | 0.00 | 4.47 | 0.00 | 0.00 | 0.00 | 0.00 | 0.00 |
| Water | 0.10 | 0.10 | 0.32 | 0.00 | 0.32 | 0.00 | 1.85 | 16.09 | 16.09 | 16.09 |
| Oxygen | 0.00 | 0.00 | 0.00 | 0.00 | 0.00 | 0.00 | 20.60 | 1.14 | 1.14 | 1.14 |
| Argon | 0.00 | 0.00 | 0.00 | 0.00 | 0.00 | 0.00 | 0.92 | 0.56 | 0.56 | 0.56 |
| Carbon Dioxide | 0.00 | 0.00 | 0.00 | 0.00 | 0.00 | 0.50 | 0.03 | 3.99 | 3.99 | 3.99 |
| Methane | 0.00 | 0.00 | 0.00 | 0.00 | 0.00 | 93.96 | 0.00 | 0.00 | 0.00 | 0.00 |
| Ethane | 0.00 | 0.00 | 0.00 | 0.00 | 0.00 | 4.20 | 0.00 | 0.00 | 0.00 | 0.00 |
| Pentane | 0.00 | 0.00 | 0.00 | 0.00 | 0.00 | 0.30 | 0.00 | 0.00 | 0.00 | 0.00 |
| Butane | 0.00 | 0.00 | 0.00 | 0.00 | 0.00 | 0.02 | 0.00 | 0.00 | 0.00 | 0.00 |
| Pentane | 0.00 | 0.00 | 0.00 | 0.00 | 0.00 | 0.02 | 0.00 | 0.00 | 0.00 | 0.00 |
| Ethylene Glycol | 0.00 | 0.00 | 0.00 | 0.00 | 0.00 | 0.00 | 0.00 | 0.00 | 0.00 | 0.00 |
| Flowrate, kmol/hr | 882.8 | 882.8 | 262.8 | 620.0 | 262.8 | 27.0 | 428.9 | 706.0 | 706.0 | 706.0 |
| Flowrate, kg/hr | 7626.0 | 7626.0 | 6376.2 | 1250.0 | 6376.0 | 458.9 | 12338.4 | 19173.4 | 19173.4 | 19173.4 |
| Pressure, bar (a) | 35.01 | 33.41 | 1.36 | 32.71 | 1.35 | 10.11 | 1.04 | 1.01 | 0.97 | 1.02 |
| Temperature, °C. | 520.3 | 50.0 | 35.0 | 50.0 | 141.9 | 30.0 | 250.3 | 684.0 | 295.0 | 133.5 |

The results indicate that, with a 1.33 mol. % ammonia slip (stream 24) from the cracker (tube furnace 201) and 95 mol. % recovery of hydrogen in the PSA, 7626 kg/h of ammonia is required (stream 2) as feed, together with 27.0 kmol/h of natural gas (stream 70) as fuel in addition to the PSA offgas (stream 60) in order to fire the cracker.

For a given hydrogen recovery and ammonia slip, the effect of using the cracked gas (instead of the flue gas) to provide the duty required to heat the partially cracked gas representation that the teaching thereof was common general knowledge in Australia or elsewhere at the date thereof.

The invention claimed is:

1. A process for cracking ammonia comprising:
providing a heated ammonia gas at super-atmospheric pressure;
feeding the heated ammonia gas at a first temperature (T1) to a first adiabatic reactor comprising a catalyst bed to crack a portion of the ammonia and produce an intermediate partially cracked ammonia gas;

heating the intermediate partially cracked ammonia gas to produce a heated intermediate partially cracked ammonia gas;
feeding the heated intermediate partially cracked ammonia gas, or a heated intermediate partially cracked ammonia gas derived therefrom, at a second temperature (T2) which is lower than the first temperature (T1) to a further adiabatic reactor comprising a catalyst bed to crack a further portion of the ammonia and produce a partially cracked ammonia gas;
combusting fuel with an oxidant gas in a furnace to heat catalyst-containing reactor tubes and form a flue gas; and
feeding the partially cracked ammonia gas to the catalyst-containing reactor tubes to cause cracking of further ammonia to produce a cracked gas comprising hydrogen gas, nitrogen gas and residual ammonia.

2. The process of claim 1 wherein the catalyst bed of the first adiabatic reactor comprises a nickel-based catalyst.

3. The process of claim 1 wherein the first temperature (T1) is in a range from about 550° C. to about 650° C.

4. The process of claim 1 wherein the catalyst bed of the further adiabatic reactor comprises a catalyst selected from a nickel-based catalyst and a ruthenium-based catalyst.

5. The process of claim 1 wherein the second temperature (T2) is in a range from about 450° C. to about 550° C.

6. The process of claim 1 wherein at least some, preferably all, of the duty required to heat the intermediate partially cracked gas is provided by heat exchange with the flue gas.

7. The process of claim 6 wherein a part of the duty required to provide the heated ammonia gas is provided by heat exchange with the flue gas upstream of the heat exchange with the intermediate partially cracked gas relative to the flow of flue gas.

8. The process of claim 1 wherein the partially cracked ammonia gas is heated to produce a heated partially cracked ammonia gas prior to being fed to the catalyst-containing reactor tubes of the furnace.

9. The process of claim 8 wherein at least some, preferably all, of the duty required to heat the partially cracked ammonia gas is provided by heat exchange with the cracked gas.

10. The process of claim 1 comprising
pumping liquid ammonia containing at least 0.1 mol % water to produce a pumped liquid ammonia;
pre-heating the pumped liquid ammonia to produce a pre-heated liquid ammonia;
vaporizing the pre-heated liquid ammonia to produce an ammonia gas; and
heating the pressurized ammonia gas to produce the heated ammonia gas at super-atmospheric pressure,
wherein the water from the liquid ammonia is present in the heated ammonia gas.

11. The process of claim 10 wherein the water is present in the heated ammonia in an amount of no more than 1 mol %.

12. The process of claim 10, wherein at least some, preferably a majority, of the heating duty required to provide the heated ammonia gas is provided by heat exchange with the cracked gas downstream of the heat exchange with the partially cracked ammonia gas relative to the flow of the cracked gas.

13. The process of claim 1 wherein the catalyst-filled tubes of the furnace and the catalyst beds of the adiabatic reactors contain no iron-based catalyst.

14. The process of claim 1 further comprising:
after cooling, recovering hydrogen from the cracked gas in a hydrogen recovery unit to produce a hydrogen gas produce and an offgas comprising nitrogen gas, residual hydrogen gas and residual ammonia gas;
heating at least a portion of the offgas to produce heated offgas; and
feeding the heated offgas as at least part of the fuel to the furnace.

15. The process of claim 14 wherein all of the offgas is fed as fuel to the furnace.

16. The process of claim 14 comprising:
dividing the offgas into a first portion and a second portion, wherein the first portion is heated and fed to the furnace; and
compressing the second portion of the offgas to produce a compressed offgas and recycling the compressed offgas to the hydrogen recovery unit for further hydrogen recovery.

17. Apparatus for cracking ammonia comprising:
a first adiabatic reactor for partially cracking heated ammonia gas at super-atmospheric pressure, the reactor comprising an inlet for heated ammonia gas, a catalyst bed having an upstream end in fluid flow communication with the inlet and a downstream end in fluid flow communication with an outlet for intermediate partially cracked ammonia gas;
a further adiabatic reactor for cracking heated intermediate partially cracked ammonia gas, or heated intermediate partially cracked ammonia gas derived therefrom, the reactor comprising an inlet in fluid flow communication with the outlet of the first adiabatic reactor, a catalyst bed having an upstream end in fluid flow communication with the inlet and a downstream end in fluid flow communication with an outlet for partially cracked ammonia gas;
a furnace comprising:
a radiant section comprising at least one inlet for fuel and oxidant gas in fluid flow communication with at least one burner, catalyst-containing reactor tubes having upstream ends in fluid flow communication with the outlet of the further adiabatic reactor and downstream ends in fluid flow communication with an outlet for cracked gas; and
a convection section in fluid flow communication with the radiant section comprising an outlet for flue gas,
a first heat exchanger for heating ammonia gas by heat exchange with flue gas in the convection section of the furnace, the first heat exchanger comprising an inlet for ammonia gas and an outlet in direct fluid flow communication with the inlet of the first adiabatic reactor,
a second heat exchanger for heating intermediate partially cracked ammonia gas by heat exchange with flue gas in the convection section of the furnace, the second heat exchanger having an inlet in direct fluid flow communication with the outlet of the first adiabatic reactor and an outlet in fluid flow communication with the inlet of the further adiabatic reactor,
wherein the first heat exchanger is located upstream of the second heat exchanger within the convection section of the furnace relative to the flow of flue gas.

18. The apparatus of claim 17 wherein the catalyst bed of the first adiabatic reactor comprises a nickel-based catalyst.

19. The apparatus of claim 17 wherein the catalyst bed of the further adiabatic reactor comprises a catalyst selected from a nickel-based catalyst and a ruthenium-based catalyst.

20. The apparatus of claim 17 comprising a further heat exchanger arranged to heat partially cracked ammonia gas by heat exchange with cracked gas located between the further adiabatic reactor and the radiant section of the furnace.

21. The apparatus of claim 20 wherein the further heat exchanger is a shell-and-tube style heat exchanger.

22. The apparatus of claim 21 wherein the shell side of the heat exchanger is in direct fluid flow communication with the outlet of the radiant section of the furnace.

23. The apparatus of claim 17 comprising:
a hydrogen recovery unit, preferably a PSA unit, for recovering hydrogen gas from cracked gas comprising:
   a first inlet in fluid flow communication with the cracked gas outlet of the radiant section of the furnace;
   a first outlet for hydrogen gas; and
   a second outlet for offgas comprising nitrogen gas, residual ammonia gas and residual hydrogen gas in fluid flow communication with the at least one inlet for fuel of the radiant section of furnace,
wherein the apparatus comprises an offgas heater arranged for heating offgas and located between the second outlet of the hydrogen recovery unit and the at least one inlet for fuel of the radiant section of the furnace.

24. The apparatus of claim 23 comprising:
a compression unit for compressing offgas, said compressor comprising:
   an inlet in fluid flow communication with the second outlet of the hydrogen recovery unit; and
   an outlet in fluid flow communication with the first inlet of the hydrogen recovery unit,
wherein the apparatus comprises a valve arrangement to control flow of offgas to the compression unit and the offgas heater.

25. The apparatus of claim 17 wherein the catalyst-filled tubes of the furnace and the catalyst beds of the adiabatic reactors contain no iron-based catalysts.

* * * * *